(12) United States Patent
Payne

(10) Patent No.: US 8,789,717 B2
(45) Date of Patent: Jul. 29, 2014

(54) DEVICE TO PREVENT REMOVAL OF FUEL AND OIL CAPS

(71) Applicant: Charles Mike Payne, Leland, MS (US)

(72) Inventor: Charles Mike Payne, Leland, MS (US)

(*) Notice: Subject to any disclaimer, the term of this patent is extended or adjusted under 35 U.S.C. 154(b) by 0 days.

(21) Appl. No.: 13/747,404

(22) Filed: Jan. 22, 2013

(65) Prior Publication Data

US 2013/0133385 A1 May 30, 2013

Related U.S. Application Data

(63) Continuation-in-part of application No. 12/692,988, filed on Jan. 25, 2010, now abandoned.

(51) Int. Cl.
*B65D 55/14* (2006.01)

(52) U.S. Cl.
USPC ............... 220/210; 220/315; 70/164; 70/165

(58) Field of Classification Search
CPC ..... E05B 83/34; B60K 15/0409; B65D 55/14
USPC .......... 220/210, 315, 322; 215/207, 277, 278; 70/164, 165, 237
See application file for complete search history.

(56) References Cited

U.S. PATENT DOCUMENTS

| 5,201,201 A | * | 4/1993 | Sylvester et al. | ............... 70/165 |
| 5,388,434 A | * | 2/1995 | Kalis | ............... 70/58 |
| 5,649,436 A | * | 7/1997 | Davidge | ............... 70/18 |

* cited by examiner

*Primary Examiner* — Fenn Mathew
*Assistant Examiner* — Madison L Poos
(74) *Attorney, Agent, or Firm* — Larry E. Severin

(57) ABSTRACT

A device to prevent removal of fuel and oil caps includes a pin having a shaft with a first and second end; a head at the first end of the shaft; a locking element at the second end of the shaft; a pad having an adhesive surface that fixes to the cap; a grommet that forms an aperture in the pad that receives the shaft of the pin so that the pad rotatably retains the pin to the cap; and a cover that is rotatably retained over the cap by the pin and the locking element so that the cap generally covers the cap and rotates independently from the cap, thereby deterring removal of the cap.

17 Claims, 3 Drawing Sheets

DEVICE TO PREVENT REMOVAL OF FUEL AND OIL CAPS

RELATED APPLICATIONS

This application claims the benefit of the filing date of U.S. patent application Ser. No. 12/692,988, filed Jan. 25, 2010, which is incorporated herein by reference in its entirety.

BACKGROUND OF THE INVENTION

The present invention generally relates to container caps, and more specifically, to a device to prevent removal of container caps such as fuel and oil caps or other caps for valuables.

With current anti-theft devices for fuel or oil caps, such as for automobiles, intruders may be able to pry off the device from the cap without anyone knowing about it.

Existing fuel caps are removed from tubes by rotating the cap. This may unscrew the cap from threads in the tube, or may disengage the cap from tabs or flanges on the tube. These caps are intended to seal the fuel or other contents in the tube. Existing security elements, if any, might be pried off by unauthorized users without detection.

As can be seen, there is a need for a device to prevent removal of fuel and oil caps.

SUMMARY OF THE INVENTION

In one aspect of the present invention, a device to deter removal of a container cap includes a pin having a shaft with a first and second end; a head at the first end of the shaft; a locking element at the second end of the shaft; a pad having an adhesive surface that fixes to the cap; a grommet that forms an aperture in the pad that receives the shaft of the pin so that the pad rotatably retains the pin to the cap; and a cover that is rotatably retained over the cap by the pin and the locking element so that the cap generally covers the cap and rotates independently from the cap, thereby deterring removal of the cap.

In another aspect of the present invention, a device to deter removal of a container cap includes a pin having a shaft with a first and second end; a head at the first end of the shaft that extends laterally from the shaft; a washer that fits over the shaft of the pin and rotatably retains the head of the pin to the cap; a locking element at the second end of the shaft; a pad having an adhesive surface on a first side that fixes to the cap and a non-sticky surface on a second side; a circular grommet that forms an aperture in the pad that receives the shaft of the pin so that the pad rotatably retains the pin to the cap; and a cover that is rotatably retained over the cap by the pin and the locking element so that the cap has sufficient size and depth to generally cover the cap and rotates independently from the cap, thereby deterring removal of the cap.

DETAILED DESCRIPTION

Figure 1:
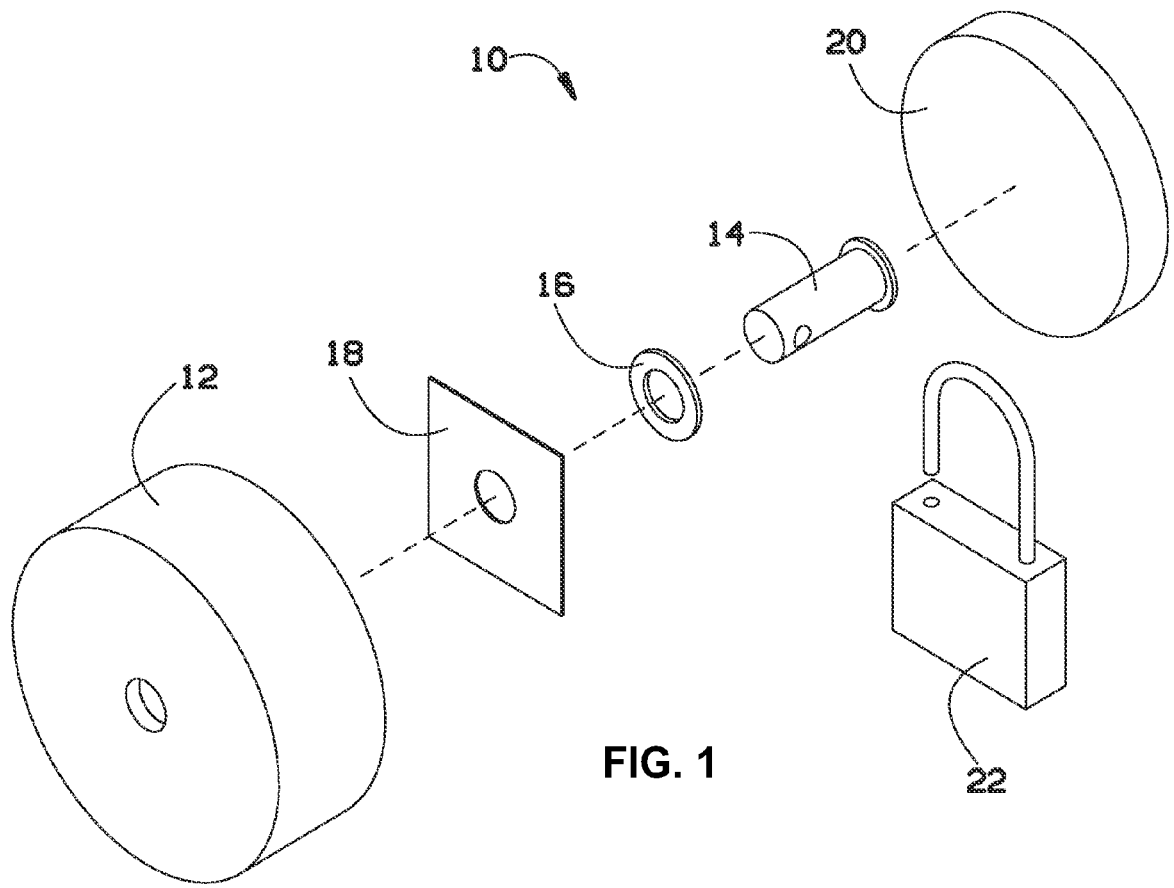
FIG. 1 depicts an exploded view of an embodiment of the present invention.

The preferred embodiment and other embodiments, which can be used in industry and include the best mode now known of carrying out the invention, are hereby described in detail with reference to the drawings. Further embodiments, features and advantages will become apparent from the ensuing description, or may be learned without undue experimentation. The figures are not necessarily drawn to scale, except where otherwise indicated. The following description of embodiments, even if phrased in terms of "the invention" or what the embodiment "is," is not to be taken in a limiting sense, but describes the manner and process of making and using the invention. The coverage of this patent will be described in the claims. The order in which steps are listed in the claims does not necessarily indicate that the steps must be performed in that order.

Broadly, an embodiment of the present invention generally provides a device that fits over existing fuel caps to prevent unauthorized removal.

An embodiment of the present invention may discourage unauthorized uses from removing the cap or at least prevent intruders from being able to take the fuel cap off without one knowing about it. When locked in place, embodiments may have an outer cover that freely rotates relative to the cap and fuel tube. If an unauthorized user rotates the outer cover, the cap is not affected. In a situation where an intruder pries off an embodiment from the fuel cap, then at least one can check the fuel and oil before starting the engine to see if it has been contaminated, thus preventing possibly thousands of dollars of mechanical damage to the engine. The cover rotates independently over the cap on the pin and the locking element and the cap generally cover the cap, thereby deterring removal of the cap. By attaching an embodiment on a gas cap, the user may deter unauthorized removal of the cap and may also immediately determine if anyone has tampered with his or her fuel, which can deter removal of the cap. An embodiment can be an attachment that is placed on an existing fuel cap to prevent the cap from being removed without adverse force.

A pad that includes a strong adhesive tape may attach to the cap, and an aperture in the pad may allow the shaft of the pin to rotate yet not allow the pin to be removed from the cap. Embodiments of a pad may include "duct tape" made of non-removable pressure sensitive adhesive tape, having a woven fabric backing coated with a plastic coating such as polyethylene on one side and an adhesive material such as glue on the other side. Embodiments of an adhesive pad for a security fuel cap may include a rubber, plastic, or similar strong flexible material. The flexible base tape may have an adhesive surface having a sticky coating such as glue on one side, and may be a strong, two-sided sticky duct tape. On the second side, the base tape may have backing such as a layer of aluminum tape and/or a layer of duct tape. Embodiments may have 5 or more layers of aluminum or other tape. Additional fasteners such as staples may be included to help hold the layers of tape together. The pad may be part of a kit, and may include a protective, removable paper cover that protects the adhesive surface until the device is to be attached to the cap. Additional screws may be provided and appropriate holes, such as 3/32", can be drilled through the pad and into the cap for the screws to securely fix the adhesive pad to the fuel cap. Washers for the screws may further help adhere the pad to the cap.

A circular grommet in the pad may be made of metal or other hard material, and may form a reinforced aperture that prevents the pin from coming in contact with the adhesive tape, thereby allowing the pin and cover to freely rotate relative to the cap and tape. The grommet may come into rotatable contact with the head of the pin directly, or with a washer that fits over the pin. The grommet may help make embodiments of the difficult to simply jerk and tear off, even when the device is hot.

The washer, if any, may be larger than the grommet so that the washer is in contact with the adhesive pad, so that the washer is fixed and the pin spins relative to the washer, or the washer may be equal in size or smaller than the grommet, so that the washer may spin as well as the pin. The washer may engage with the pin so as to effectively enlarge the head of the pin, and may also provide a second element for rotation between the cap and the cover.

A locking element, such as a padlock, can be locked or unlocked from the outer end of the shaft so that the cover can be locked in place for security and then released for access to the cap and therefore the contents of the tube. The locking element may include a padlock or other component, either separate from or integrated into the rest of the device, that prevents the cover from being removed from the pin when the cap and lock are in place. If the device is forcibly pried off when the device is locked, said removal will be apparent.

As depicted in FIG. 1, an embodiment 10 may include a round cover 12 made of a plastic or poly material, but other materials could be used. This cover may come in different sizes. Exemplary cover sizes may be between 6 inches and 2.5 inches in diameter with sides ranging from 1 inch to 1.4 inches deep; however the depth could be deeper and the diameter of the cover could be larger depending on how large a fuel or petroleum cap is to be covered. The thickness of the poly cover may measure approximately 0.17 inches, and this thickness may also vary.

As depicted in FIG. 1, an embodiment 10 attaches a round cover 12 to the fuel or petroleum cap 20, and may include a metal clevis pin 14 approximately 1 inch long with a hole in the top side approximately 0.15 inch diameter. Pin 14 may have a flat head on the bottom approximately 0.50 inches in diameter. The diameter of the shaft of the pin may be approximately 0.37 inches. The embodiment may include a flat washer 16 that attaches to the metal pin 14. These may be smaller or larger depending on stock items of various manufactures that produce these various kit components. The embodiment may include a section of aluminum patch tape 18. Tape 18 may be used to install the metal pin 14 and washer 16 to a fuel or oil petroleum cap 20. Other materials can be used in place of the aluminum patch material. The embodiment may include a 0.75 inch padlock 22, but the size may vary.

Figure 2:
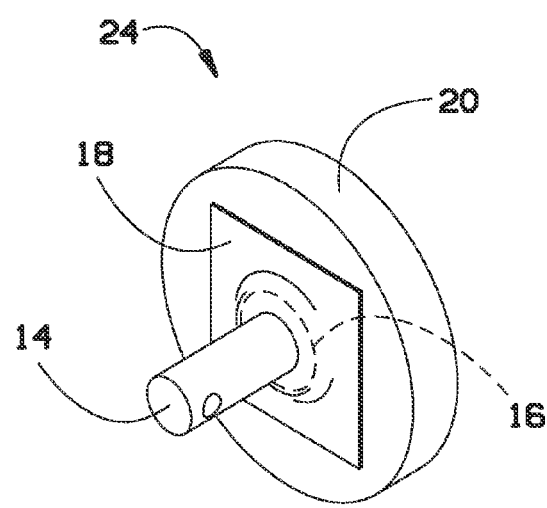
FIG. 2 depicts an embodiment of a cap-with-pin according to the present invention.

As depicted in the embodiment of FIG. 2, an embodiment of a cap-with-pin 24 may be prepared by placing the washer 16 over the pin 14, then placing the tape 18 over the pin and washer to adhere to the cap.

Figure 3:
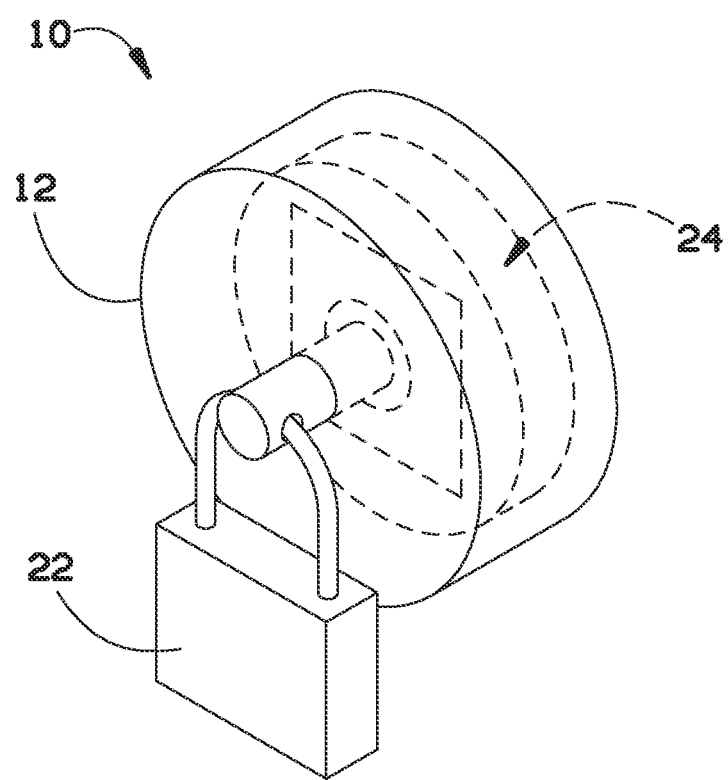
FIG. 3 depicts the embodiment of FIG. 1 in use.

As depicted in the embodiment of FIG. 3, an embodiment of a cover 12 may be placed over the cap-with-pin 24, and locked in place with padlock 22.

Figure 4:
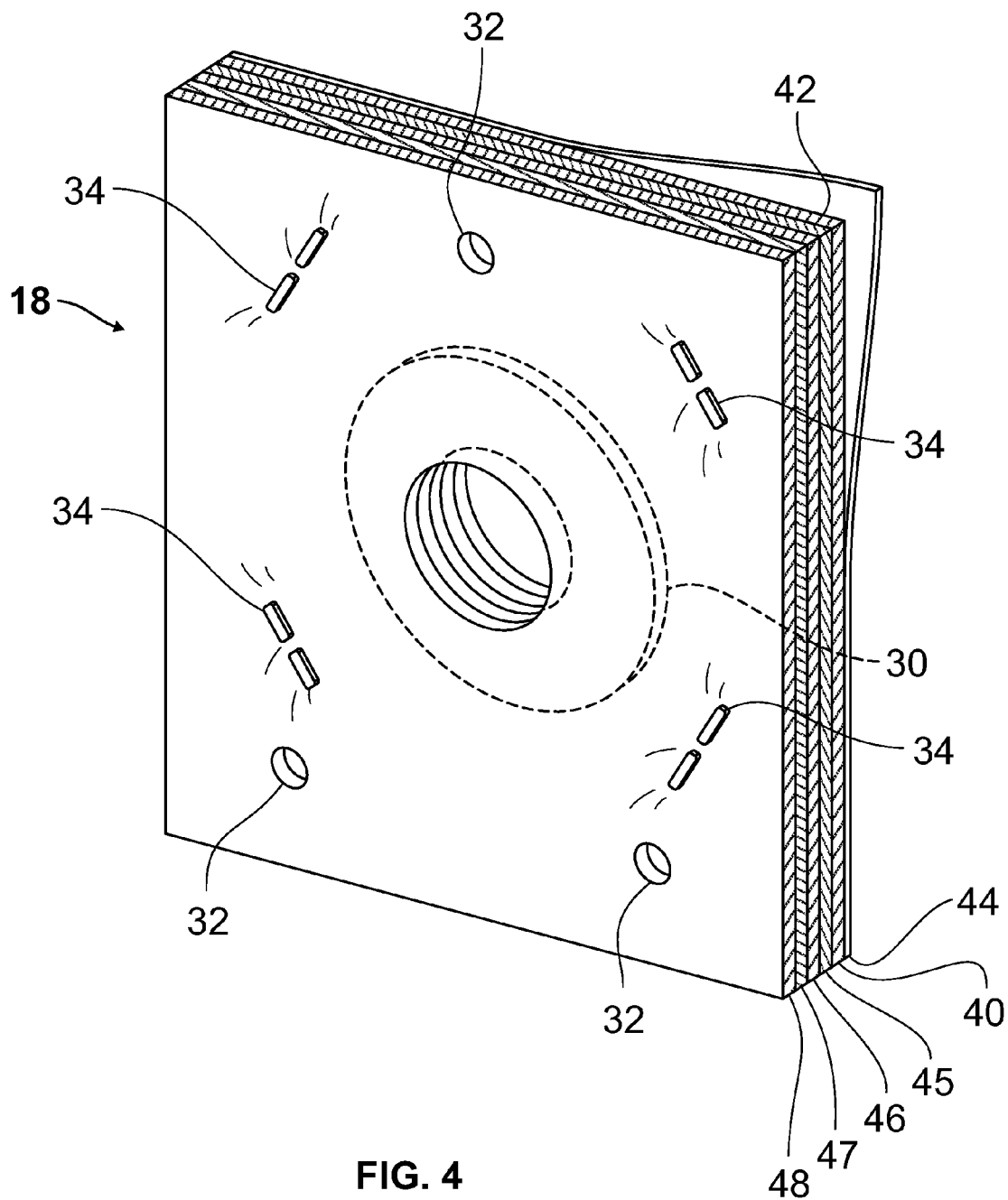
FIG. 4 depicts a pad according to the embodiment of FIG. 1.

As depicted in the embodiment of FIG. 4, an embodiment of a pad 18 may include a grommet 30, screws 32, and staples 34. The layers of the pad 18 may include a base tape 40 with an adhesive surface 42. A protective, removable paper cover 44 may protect the adhesive surface 42 until the pad 18 is to be attached. A layer of aluminum tape 45 may reinforce the outer side of base tape 40, and yet other layers of duct tape 46, 47 and 48, (four layers) such as 11 mil. duct tape, may further reinforce the outside surface of the aluminum tape 45. Embodiments may have a single layer of outer duct tape, or may have up to 4 or more layers as in the embodiment depicted in FIG. 4. The removable paper cover 44 may be peeled off for use, to expose the adhesive surface 42 which may include glue, epoxy, or other sticky material.

An embodiment of a kit may also include a small piece of sand paper or other abrasive to clean the surface of the fuel cap before the adhesive pad is attached. The kit may also include a peelable paper cover for the adhesive surface.

In an embodiment, the head on the pin may hold the pin in place to the washer, and allow the pin to rotate even after the aluminum patch tape is placed over the washer and fuel cap. This may prevent the fuel cap from being removed by turning the padlock.

To apply an embodiment, one may clean the center of the fuel cap (use oil free solvent) and let dry. Take the sand paper or other abrasive and lightly sand the center of the fuel cap. Wipe this area off with a clean dry cloth. Place the metal washer on the pin. Push the pin thru the hole in the aluminum patch tape (with sticky side of tape on bottom). Put the patch tape with pin on the center of the fuel cap. Put the cover on the pin thru the hole in the center of the cover. Put the padlock on the top of the pin and lock it.

I claim:

1. A device to deter removal of a container cap, comprising:
   a pin having a shaft with a first and second end;
   a head at the first end of the shaft;
   a washer that fits over the shaft of the pin and rotatably retains the head of the pin to the cap;
   a locking element at the second end of the shaft;
   a pad having an adhesive surface that fixes to the cap;
   a grommet that forms an aperture in the pad that receives the shaft of the pin so that the pad rotatably retains the pin to the cap; and
   a cover that is rotatably retained over the cap by the pin and the locking element so that the cover generally covers the cap and rotates independently from the cap, thereby deterring removal of the cap.

2. The device of claim 1, wherein the cap has a top and sides, and the cover covers the top and sides of the cap and has sufficient depth to extend beyond the sides of the cap, so that a user cannot rotate the cap using only the user's hand.

3. The device of claim 1, wherein the pad is a tape having a sticky side and the tape is positioned over the washer and fixes the washer to the cap so that the pin is free to rotate relative to the cap.

4. The device of claim 1, wherein the washer is no larger than the grommet, and the adhesive pad rotatably retains a washer to the cap so that both the pin and the washer are free to rotate.

5. The device of claim 1, wherein the pad is a flexible material with a sticky surface on a first side, to adhere to the cap, and a non-sticky surface on a second side, to allow the cover to rotate.

6. The device of claim 1, wherein the head is a circular base that extends laterally from the shaft.

7. The device of claim 1, wherein the head of the pin has a radius that is less than a radius of the grommet, thereby allowing the pin to freely rotate without coming in direct contact with the pad.

8. The device of claim 1, wherein the grommet is circular and forms a round aperture.

9. A device to deter removal of a container cap, comprising:
   a pin having a shaft with a first and second end;
   a head at the first end of the shaft;
   a locking element at the second end of the shaft;
   a pad having an adhesive surface that fixes to the cap, the pad being generally a rubber or plastic tape with additional layers of tape for reinforcement, and a plurality of fasteners to help hold the layers together;

a grommet that forms an aperture in the pad that receives the shaft of the pin so that the pad rotatably retains the pin to the cap; and a cover that is rotatably retained over the cap by the pin and the locking element so that the cap generally covers the cap and rotates independently from the cap, thereby deterring removal of the cap.

10. A device to deter removal of a container cap, comprising:

a pin having a shaft with a first and second end;
a head at the first end of the shaft;
a locking element at the second end of the shaft;
a pad having an adhesive surface that fixes to the cap, wherein the pad comprises a base tape having the adhesive surface on a first side and a second surface on a second side, a sticky coating on the adhesive surface of the base tape, adapted to stick to the container cap, a layer of aluminum tape having first and second sides, fixed to the second side of the base tape, and a layer of duct tape on the aluminum tape;
a grommet that forms an aperture in the pad that receives the shaft of the pin so that the pad rotatably retains the pin to the cap; and
a cover that is rotatably retained over the cap by the pin and the locking element so that the cap generally covers the cap and rotates independently from the cap, thereby deterring removal of the cap.

11. The device of claim 1, further comprising a plurality of screws that fix the pad to the cap.

12. The device of claim 1, wherein the cap includes a generally metal surface, and the pad adhesively attaches to the metal surface.

13. The device of claim 1, wherein the locking element includes an aperture in the second end of the shaft and a removable padlock that locks through the aperture.

14. The device of claim 1, further comprising a kit including an abrasive to clean the cap before the pad is fixed to the cap.

15. The device of claim 1, further comprising a protective, removable paper cover that protects the adhesive surface until the device is to be attached to the cap.

16. A device to deter removal of a container cap, comprising:

a pin having a shaft with a first and second end;
a head at the first end of the shaft that extends laterally from the shaft;
a washer that fits over the shaft of the pin and rotatably retains the head of the pin to the cap;
a locking element at the second end of the shaft;
a pad having an adhesive surface on a first side that fixes to the cap and a non-sticky surface on a second side;
a circular grommet that forms an aperture in the pad that receives the shaft of the pin so that the pad rotatably retains the pin to the cap; and
a cover that is rotatably retained over the cap by the pin and the locking element so that the cover has sufficient size and depth to generally cover the cap and rotates independently from the cap, thereby deterring removal of the cap.

17. The device of claim 16, further comprising:
a base tape having the adhesive surface on a first side and a second surface on a second side;
a sticky coating on the adhesive surface of the base tape, adapted to stick to the container cap;
a layer of aluminum tape having first and second sides, fixed to the second side of the base tape;
a layer of duct tape on the aluminum tape;
a plurality of fasteners to help hold the layers together; and
a plurality of screws that fix the pad to the cap.

* * * * *